Figure 5:
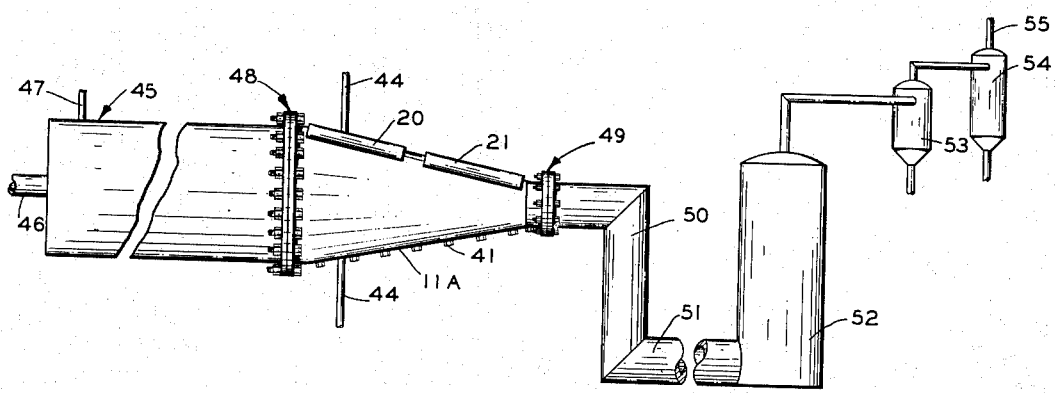

Jan. 17, 1956
R. E. HEFFNER
2,731,466
QUENCH SECTION FOR CARBON BLACK PRODUCTION FURNACE
Filed Nov. 26, 1951
2 Sheets-Sheet 1
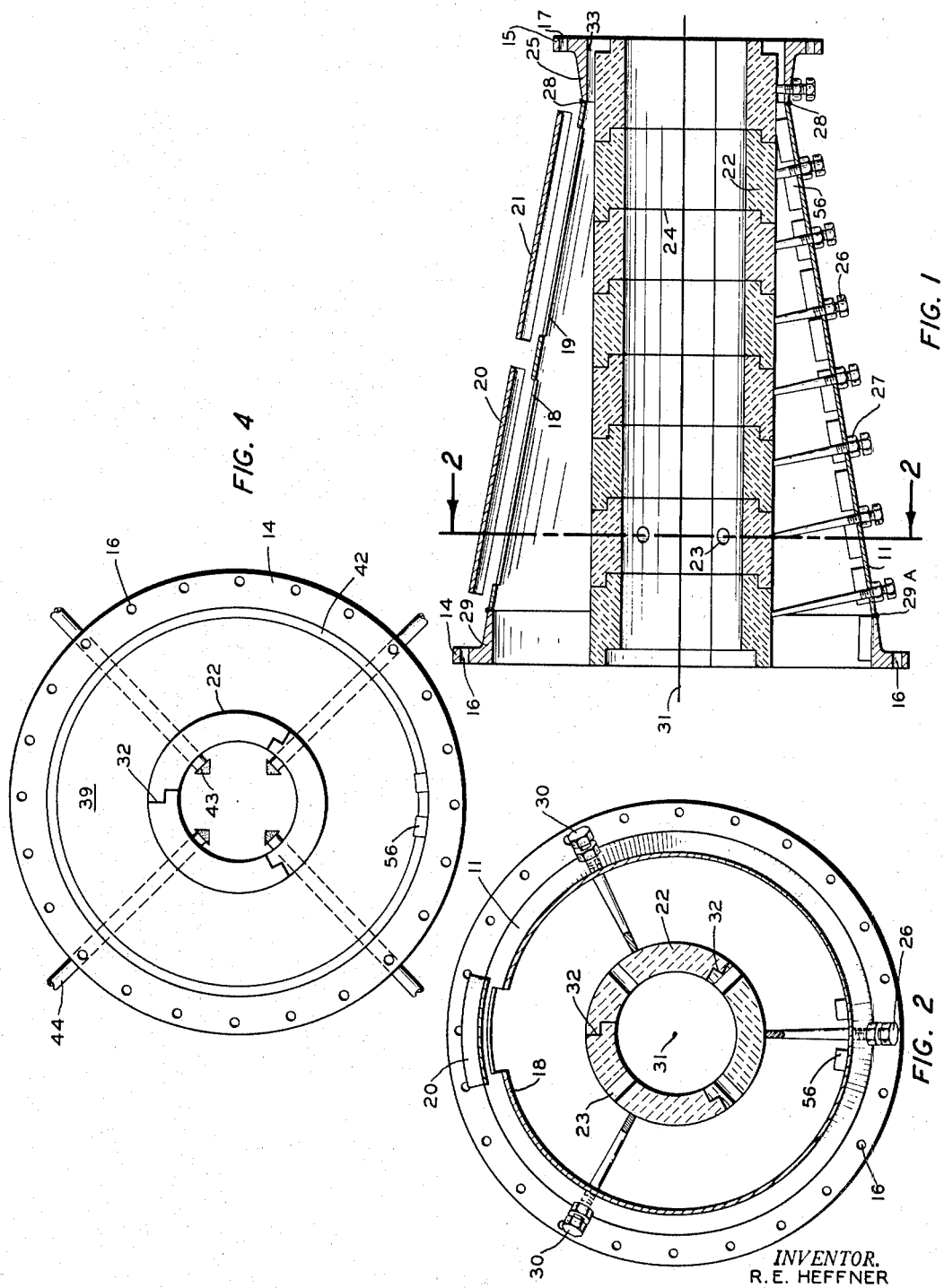
INVENTOR.
R. E. HEFFNER
BY *Hudson & Young*
ATTORNEYS Jan. 17, 1956 R. E. HEFFNER 2,731,466
QUENCH SECTION FOR CARBON BLACK PRODUCTION FURNACE
Filed Nov. 26, 1951 2 Sheets-Sheet 2

INVENTOR.
R. E. HEFFNER
BY
ATTORNEYS

United States Patent Office 2,731,466
Patented Jan. 17, 1956

2,731,466

QUENCH SECTION FOR CARBON BLACK PRODUCTION FURNACE

Robert E. Heffner, Idaho Falls, Idaho, assignor to Phillips Petroleum Company, a corporation of Delaware Application November 26, 1951, Serial No. 258,238

9 Claims. (Cl. 23—259.5)

This invention relates to a quench section for use with a carbon black producing furnace. In one aspect it relates to a quench section for quenching the hot gaseous effluent containing suspended carbon black issuing from a carbon black production furnace. In another aspect it relates to a quench section for water quenching of effluent gases containing carbon black from a carbon black production furnace.

The production of carbon black by the so called furnace method is old in the art. It is also known that gases carrying newly formed carbon black in suspension issuing from such furnaces must be quickly cooled in order to prevent further reaction with the simultaneous degradation of the properties of the carbon black. One conventional method of carrying out such a quenching operation is to spray liquid water into the high temperature furnace effluent resulting in the rapid chilling or quenching thereof. Prior art teaches the use of a quench section bolted or otherwise attached to the downstream end of the carbon black production furnace. The conduit in such quench sections is of a uniform wall thickness and is frequently of the same inside diameter as the inner diameter of the carbon black production furnace. Other examples of quench sections show the attaching of a quench section of uniform wall thickness to a furnace having a larger diameter than the inner diameter of the quench section. In this latter case the outlet end of the furnace chamber is closed with the exception of a centrally positioned opening with which the conduit of the quench section communicates. All of these known types of furnace exhibit the outer shell of the quench section as possessing a uniform and smaller diameter than the diameter of the shell of the furnace itself. The outlet end of these furnaces is generally provided with an annular piece of steel, the outer circumference of which is welded to the cylindrical furnace shell and the quench shell is welded or flanged into the opening in this annular plate. It has been found that such a type of construction permits warping of the joints between the quench section and the end plate of the furnace shell and between this end plate and the cylindrical furnace shell as a result of high temperatures in the quench section.

Under some conditions carbon black producing furnaces are provided with such quench sections having their inner walls lined with refractory while others have unprotected steel wall quench sections. Further, some quench sections are provided with water jacket coolers while others are not.

An object of my invention is to devise a mechanical structure of quench section for use with a carbon black furnace which does not permit the above mentioned undesirable warping.

Another object of my invention is to devise a quench section for use with a carbon black furnace which can be used for long periods of time and at least for such a period of time as the normal life of the shell of the furnace proper.

Another object of my invention is to devise a quench section for carbon black furnaces which is easily and relatively inexpensive to construct and which may be identified by a long and useful period of life.

Other objects and advantages of my invention will be appreciated by those skilled in the art upon reading the attached specification.

I have achieved the above enumerated and other objects and advantages by devising a quench section which is encased in a steel case or shell having a frusto-conical outer wall and a conduit therethrough of uniform diameter. This conduit is refractory lined so as to protect the shell walls from excessive heat. By use of the conically shaped quench section case I have found that over a long period of time there is no or substantially no warping at the point of juncture of my quench section with the furnace and at the point of juncture of the quench section with the pipe leading from the quench section to a further cooler and carbon black separation apparatus.

Figure 3:
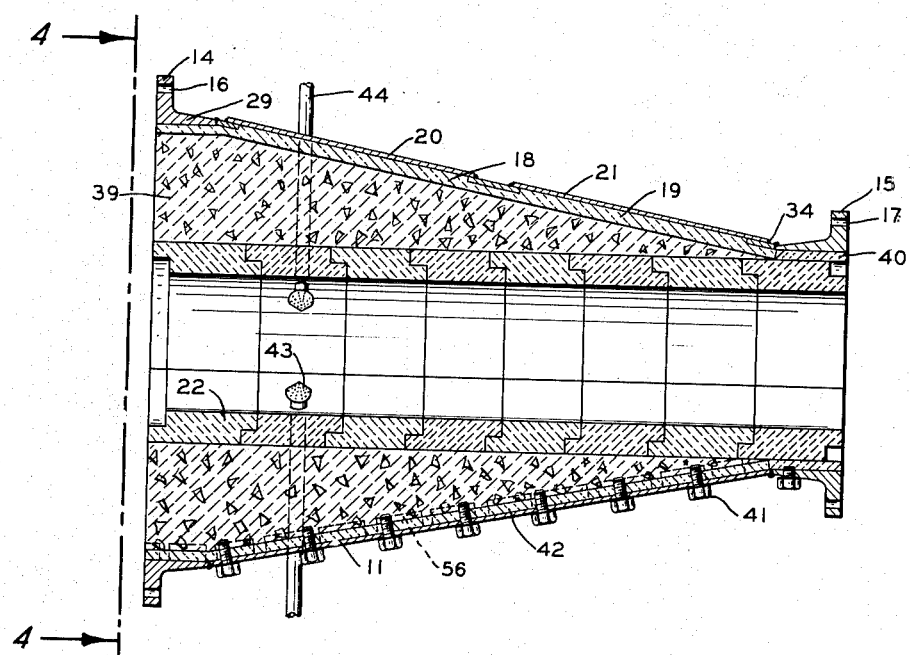

In the drawing Figure 1 is a diagrammatic longitudinal view, partly in section, of a partly constructed quench section apparatus of my invention. Figure 2 is a cross sectional view taken on the line 2—2 of Figure 1. Figure 3 is a longitudinal view, partly in section, of my quench section apparatus completely constructed. Figure 4 is an end view of Figure 3 looking from the direction of the line 4—4. Figure 5 illustrates a carbon black producing apparatus in diagrammatic form illustrating the positioning of my quench section.

Referring now to the drawing and specifically to Figure 1, this apparatus is composed of a frusto-conical steel shell 11. At the small diameter end of this conical shell 11 is a circular or annular collar 25 attached to the conical shell 11 by weld 28. This collar 25 is provided with a flange 15 containing bolt holes 17 as illustrated. At the large diameter end of the shell 11 is a collar 29 to which is attached a flange 14 containing bolted holes 16. This collar 29 is attached to the conical shell, also, by weld 29A.

As illustrated in Figure 1, in a line along the bottom of the conical shell 11 are inserted some taper bolts 26, as shown. These bolts include lock nuts 27 for locking the taper bolts into position. In Figure 2 which is a cross section of Figure 1 on the line 2—2 is shown one of the taper bolts 26 in position along the bottom of the apparatus. Spaced at 120 degree intervals around the body of this conical shell are two additional rows of taper bolts identified by reference numerals 30. A wire 31 is disposed along the axis of this taper section for use as a guide for the proper positioning of both the longitudinal and the radially disposed apparatus parts. Either before or after installation of this wire 31 I apply a coat of Insulag heat insulation material 42 (Figure 3) to the inner wall of the conical shell 11 and the inner wall of the collar 29. In a quench section of about 5 feet or so in length which is to be attached, for example, to a carbon black furnace shell of about 40 inches in diameter I prefer that this Insulag heat insulating liner should be about 1-inch in thickness. Insulag heat insulation material is an asbestos containing castable refractory.

Prior to the application of this liner material to the conical shell and collars 29 and 25, I place in position two rows of heat insulating brick 56 as illustrated in Figures 1, 2, 3 and 4 in such a manner that the bricks are in direct contact with the steel shell. The two rows of brick are separated sufficiently as to accommodate the bottom row of taper bolts 26. After positioning of these insulating bricks 56 then the insulating material 42 (Insulag) may be packed around the brick 56 and the bottom row of taper bolts 26 in such a manner as to hold the bricks 56 tightly in their position. The remainder of the inner wall of shell 11 may then also be coated with the Insulag. It is intended however that the taper bolts are to be free for rotation by breaking the bond between the Insulag and the bolts so that their position may be adjusted. After installing the layer of insulating material 42 a refractory liner 22 is positioned in the center of the shell. This liner is made up of precast sillimanite sections. Sillimanite is a well known aluminum silicate refractory. These precast circular sections are preferably cast in three 120 degree sections and of convenient width. By casting these sillimanite sections in 120 degree segments each ring of sillimanite liner can be easily positioned concentric with the guide wire 31 by three corresponding taper bolts. This positioning is illustrated in Figure 2. Each of the sillimanite 120 degree sections is cast with an end shoulder or offset 32 to assist in the repositioning of these sections. It is preferable to position each set of three 120-degree sections around the guide wire 31 and to wrap the section with paper held by adhesive tape of some type. Thus by so preassembling each of the sillimanite rings its ultimate positioning within the conical shell is relatively simple by merely adjusting the taper bolts 26 and 30. After a given ring of refractory is positioned the lock nuts 27 of the taper bolts are adjusted to prevent accidental movement of the taper bolts 26 and 30 to hold the refractory ring rigidly and in its proper position. It is preferable to install the sillimanite refractory rings beginning at the small diameter end of the quench apparatus. After positioning of the first ring of sillimanite the second or next successive ring of sillimanite is assembled into its circular form and held in this form by wrapping with paper and adhesive tape. This second ring is then positioned in the conical member 11 by adjustment of the taper bolts as just described. Each sillimanite ring is provided with shoulders 24 to assist further in the positioning of these rings. It is preferable to mortar the 120 degree sections together at points 32 so that subsequent leakage will not occur. It is preferable to seal the joints 24 between the ringed sections by the use of 1/16 inch thick paper without the use of mortar. This procedure is followed in the installation of all of the ringed sillimanite sections. The next to last full ringed sillimanite section contains small diameter openings 23 for subsequent inserting of water spray apparatus. In the particular embodiment illustrated herein there are four of these holes 23 for insertion of four water spray pipes. After installation and positioning of all of the circular sillimanite sections the small diameter annular space 33 between the outer circumference of the sillimanite ring and the inner circumference of the collar 25 is packed with some sillimanite ramming mix 40. This sillimanite ramming mix is a sillimanite containing granular material which sets with water and the use of ths mix rigidly holds the first sillimanite rings in position.

After positioning of the insulating bricks 56, applying of the insulating coating of Insulag 42, and installation of the sillimanite rings 22, a solid plate, not shown, is bolted over the large diameter end of the apparatus by bolts through bolt holes 16. After positioning of this plate a mortar of refractory forming material is applied through access openings 18 and 19. This refractory forming mortar is preferably such a commercial material as Kaocast, which is a high alumina, castable, hydraulically setting refractory. After a period of time this mortar sets to form a firm and hard mass of refractory such as will withstand high temperature furnace operation. After this material sets, the cover plate, not shown, is unbolted from the flange 14. After removal of this cover plate from the flange 14 this quench apparatus may be attached to the end of the carbon black furnace for curing of the cast refractory material. When such a refractory material as Kaocast is used I suggest the following curing procedure: (1) Air dry for 24 hours before applying heat. (2) Heat to 200° F. for 48 hours. (3) Heat to 600° F. for 48 hours. (4) Gradually increase temperature at a rate of about 25° F. per hour to 1500° F. and maintained at that temperature for about four days. (5) Apply about 2 inches of mineral wool as a blanket to the outside of the quench section in such a manner as to allow easy passage of steam. (6) Gradually increase the temperature at a rate of about 25° per hour to 2400° F. and maintained at this temperature for four days or longer and until steaming is considered complete. Steam is circulated through this mineral wool blanket to prevent the temperature of the steel shell from exceeding 400° F. (7) All temperatures except that of the shell should preferably be measured at the interface between the precast sillimanite members or shapes and the Kaocast refractory by means of indicating thermocouples.

The usual mixing, pouring and curing steps known to all skilled in the art of casting refractories such as Kaocast are followed. While in the usual practice it is customary to use about 1.6 gallons of water per 100 pounds of dry Kaocast, I have found that as much as 1.8 gallons of water per 100 pounds may be used advantageously for pouring. It is preferable to dry mix the Kaocast material well before adding the water. It is further preferred to wet the Insulag liner before pouring the Kaocast refractory. The bricks 56 of Figures 1 to 4 are intended to serve as support means for carrying the main weight load of the body of Kaocast material. The Insulag insulation possesses a relatively low compressive strength, hence, as a protective measure, we prefer to use at least two rows of said support brick to carry the weight load of the Kaocast refractory 39 and the refractory liner 22.

After completing the above suggested curing operations the taper bolts 26 and 30 should be removed. The openings made in the Kaocast refractory by removal of the taper bolts should be filled with Kaocast material. The portion of these openings extending through the Insulag liner should preferably be filled with Insulag. After filling these taper bolt holes in this manner the threaded openings in the steel shell 11 should be plugged with plug bolts 41 (Figure 3).

After the curing operation a coating of Insulag material should preferably be applied to the surface of the Kaocast refractory in the access openings 18 and 19. After applying this final Insulag material and after it dries the cover plates 20 and 21 are placed over these access openings by welds 34. These cover plates in their final welded position may be seen on reference to Figure 3. In this figure also may be seen the insulating bricks 56, the Insulag material 42 and the Kaocast refractory 39, along with the other elements of this apparatus. The sillimanite ramming mix is illustrated and identified in Figure 3 by reference numeral 40. After the insulating and curing operations are complete some holes are drilled through the steel shell 11 and through the Insulag and Kaocast materials in such a manner as to line up with the holes 23 in the one ring of sillimanite refractory liner. These holes are to provide access for pipes for water quenching purposes. On the inner end of these water pipes 44, as illustrated in Figures 3 and 4, are attached spray nozzles 43.

The paper spacers used between the sillimanite rings and the paper wrapped around these rings burns away during the Kaocast curing operations. The use of this paper serves several purposes. One purpose is that it is useful in the original assembling and positioning operations. Another purpose is that when the quenched section is in commercial use there are provided very small spaces for thermal expansion purposes. In Figure 5 is illustrated diagrammatically an assembly of carbon black manufacturing and cooling elements such as would be used in the production of commercial carbon black. In this figure a furnace apparatus 45 is shown diagrammatically as having a hydrocarbon charge pipe 46 and a pipe 47 for introduction of a combustion supporting gas tangentially into the furnace. A flange gasket assembly 48 provides for bolting the quench section 11A to the furnace. The access opening cover plates 20 and 21, the plug bolts 41 and the water pipes 44 may be seen. To the small diameter end of the quench section is attached a conduit 50 by a flange and gasket assembly 49, the conduit 50 being for carrying the quenched furnace gases containing suspended carbon to a further conduit 51. The conduit 51 may be merely a further conduit for conduction of furnace effluent to a carbon black separator 52 or this conduit 51 may serve simultaneously as an atmospheric cooling means for further cooling of the furnace effluents by heat exchange with the atmosphere. The carbon black separator 52 may be a conventional bag filter apparatus or an electrical precipitator such as the conventional Cottrell electro precipitator. From this carbon black separator, effluent gases are passed to cyclone separators 53 and 54 for recovery of carbon black not recovered in the separator 52. From the cyclone separator 54 the gases may be passed to a stack, not shown, through a conduit 55.

While I have described my quench section as being constructed from such commercially available materials as the Insulag, the Kaocast, the sillimanite ramming mix, other materials of construction which are suitable for the intended purpose and use of the apparatus may be used. While other materials may be used, I have found that the materials above set forth are very satisfactory for their intended use.

While certain embodiments of the invention have been described for illustrative purposes the invention is obviously not limited thereto.

I claim:

1. A quench section for a carbon black producing furnace comprising a hollow truncated conical shell having flanges on either end, a truncated conical body of a first refractory fitted into said hollow shell, said first refractory having a cylindrical conduit therethrough, the axis of said conduit coinciding with the axes of said hollow conical shell and said conical body of first refractory, an elongated hollow cylindrical body of a second refractory disposed axially within and rigidly attached to said first refractory, a second conduit extending through said hollow truncated conical shell and said first and second refractories, a pipe disposed within said second conduit and extending from a point outside said shell to a point in the hollow space within the cylindrical body of said second refractory, and a spray nozzle disposed on the end of said pipe within said hollow space.

2. A quench section for a carbon black producing furnace comprising a hollow truncated conical shell having flanges on either end, a truncated conical body of a first refractory fitted into said hollow shell, said first refractory having a cylindrical conduit therethrough, the axis of said conduit coinciding with the axes of said hollow conical shell and said conical body of first refractory, an elongated hollow cylindrical body of a second refractory disposed axially within and rigidly attached to said first refractory, and a conduit extending through said hollow truncated conical shell, and said first and second refractories, the axis of the last mentioned conduit being in general perpendicular to the axis of said conduit.

3. A carbon black production furnace quench section comprising a truncated conical shell filled with a first solid refractory material, a cylindrical conduit within said refractory material and disposed along the axis of said conical shell, a liner of a second refractory material covering the inner wall of said first refractory, a second conduit extending through the wall of said shell and said first and second refractories, the axis of said second conduit being, in general, perpendicular to the axis of said cylindrical conduit, a third conduit disposed axially within said second conduit and adapted to transmit fluid, a spray nozzle on the end of said third conduit within said cylindrical conduit, and a flange on either end of said shell.

4. The quench section of claim 3 having a plurality of said second conduits in the wall of said shell and said first and second refractories, a plurality of third conduits one each being disposed axially within each second conduit of said plurality of second conduits, each third conduit being adapted to transmit fluid from a point outside of the quench section to a point within said cylindrical conduit, and a spray nozzle on the end of each third conduit disposed within said cylindrical conduit.

5. A carbon black production furnace assembly comprising, in combination, an elongated cylindrical carbon black producing furnace, a first conduit disposed axially in the inlet end of said furnace for introducing carbon containing charge stock, a second conduit extending tangentially of the inner wall of said furnace into said furnace at a point near the inlet end thereof to supply combustion supporting gas, a cylindrical conduit quench section attached to the downstream end of said furnace for quenching the furnace effluent, and a truncated conical body of a refractory enclosing said quench section, the larger diameter end of said body being adjacent the outlet end of said furnace.

6. The furnace assembly of claim 5 wherein said quench section comprises, in combination, a truncated conical shell filled with a first solid refractory material, a flange on either end of said shell, the flange on the basal end of said conical shell being rigidly attached to the downstream end of said furnace in such a manner that the axis of the conical shell is a continuation of the axis of the furnace, a cylindrical conduit within said first refractory material disposed axially with respect to said conical shell, said cylindrical conduit being a continuation of a reaction zone in the furnace, a liner of a second refractory material covering the walls of said cylindrical conduit, an opening in the wall of said shell and said first and second refractories, a second conduit disposed axially within said opening and adapted to transmit fluid from a point outside said shell to a point within said cylindrical conduit, a spray nozzle on the end of said second conduit within said cylindrical conduit, and the flange on the small diameter end of said shell, said second-mentioned flange being adapted to be attached to a carbon black separating means.

7. A carbon black production furnace quench section comprising an elongated truncated conical shell, having flanges on either end, a soft heat insulating liner affixed to the inner wall of said conical shell, the space within the confines of said soft liner being filled with a first refractory material, a cylindrical conduit within said first refractory material and disposed along the axis of said shell, a liner of a second refractory material covering the wall of said cylindrical conduit, a second conduit in the wall of said shell and said heat insulating liner and first and second refractories, the axis of said second conduit being in general perpendicular to the wall of said cylindrical conduit, a second conduit disposed axially within said opening and adapted to transmit fluid, and a spray nozzle on the end of said second conduit within said cylindrical conduit.

8. The combination in accordance with claim 7, wherein a plurality of insulating brick are disposed on the inner wall of said conical shell in such a manner as to form two parallel rows of said brick extending from the basal end of said conical shell toward the other end, said rows being arranged at a spaced distance from each other.

9. The combination in accordance with claim 5 wherein the outside diameter of the downstream end of said furnace is substantially equal to the outside diameter of the larger end of the refractory of said quench section.

(References on following page)

References Cited in the file of this patent

UNITED STATES PATENTS

| | | |
|---|---|---|
| 824,469 | Cline | June 26, 1906 |
| 1,017,394 | Dvorak | Feb. 13, 1912 |
| 1,652,956 | Purtyman | Dec. 13, 1927 |
| 2,074,802 | Noble | Mar. 23, 1937 |
| 2,238,576 | Heller et al. | Apr. 15, 1941 |
| 2,368,828 | Hanson et al. | Feb. 8, 1945 |
| 2,419,565 | Krejci | Apr. 29, 1947 |
| 2,556,196 | Krejci | June 12, 1951 |
| 2,597,232 | Eckholm et al. | May 20, 1952 |